United States Patent
Trautner et al.

(10) Patent No.: US 8,077,579 B2
(45) Date of Patent: Dec. 13, 2011

(54) HOLOGRAPHIC RECORDING MEDIUM AND PICKUP FOR THIS MEDIUM

(75) Inventors: Heiko Trautner, Unterkirnach (DE); Hartmut Richter, Villingen-Schwenningen (DE)

(73) Assignee: Thomson Licensing (FR)

( * ) Notice: Subject to any disclaimer, the term of this patent is extended or adjusted under 35 U.S.C. 154(b) by 304 days.

(21) Appl. No.: 12/315,462

(22) Filed: Dec. 3, 2008

(65) Prior Publication Data

US 2009/0161518 A1    Jun. 25, 2009

(30) Foreign Application Priority Data

Dec. 21, 2007  (EP) .................................. 07123971

(51) Int. Cl.
*G11B 7/00* (2006.01)

(52) U.S. Cl. ........................................ 369/103; 369/284

(58) Field of Classification Search .................. 369/103, 369/284
See application file for complete search history.

(56) References Cited

U.S. PATENT DOCUMENTS

| | | | |
|---|---|---|---|
| 6,574,174 B1 * | 6/2003 | Amble et al. ............. 369/44.26 |
| 7,313,072 B2 * | 12/2007 | Tsukagoshi ................ 369/103 |
| 7,342,697 B2 * | 3/2008 | Uno et al. ...................... 359/24 |
| 2005/0002311 A1 * | 1/2005 | Ichihara et al. ............... 369/103 |
| 2006/0262711 A1 * | 11/2006 | Shintani et al. ............ 369/275.3 |
| 2007/0243472 A1 | 10/2007 | Ando et al. |
| 2008/0037082 A1 * | 2/2008 | Ogasawara ....................... 359/3 |
| 2008/0037083 A1 * | 2/2008 | Ogasawara ....................... 359/3 |
| 2009/0303854 A1 * | 12/2009 | Nakatani et al. ................. 369/94 |

FOREIGN PATENT DOCUMENTS

| | | |
|---|---|---|
| EP | 1455246 A1 | 9/2004 |
| EP | 1732067 A1 | 12/2006 |
| EP | 1734515 A1 * | 12/2006 |
| EP | 1906391 A1 | 4/2008 |
| WO | WO 2008099705 A1 * | 8/2008 |

OTHER PUBLICATIONS

Search report dated May 22, 2008.

* cited by examiner

*Primary Examiner* — Adam R. Giesy
(74) *Attorney, Agent, or Firm* — Jack Schwartz & Associates, PLLC

(57) ABSTRACT

A holographic recording medium with an improved servo structure is presented. The holographic recording medium has a hologram layer for storing holograms and a servo layer for positioning a light beam for reading and/or recording of a hologram relative to the holographic recording medium. The servo layer is an essentially flat dye recording layer. A holographic pickup for use with such a holographic recording medium includes a light source for generating a light beam, which interacts with the dye recording layer for recording servo information.

6 Claims, 2 Drawing Sheets

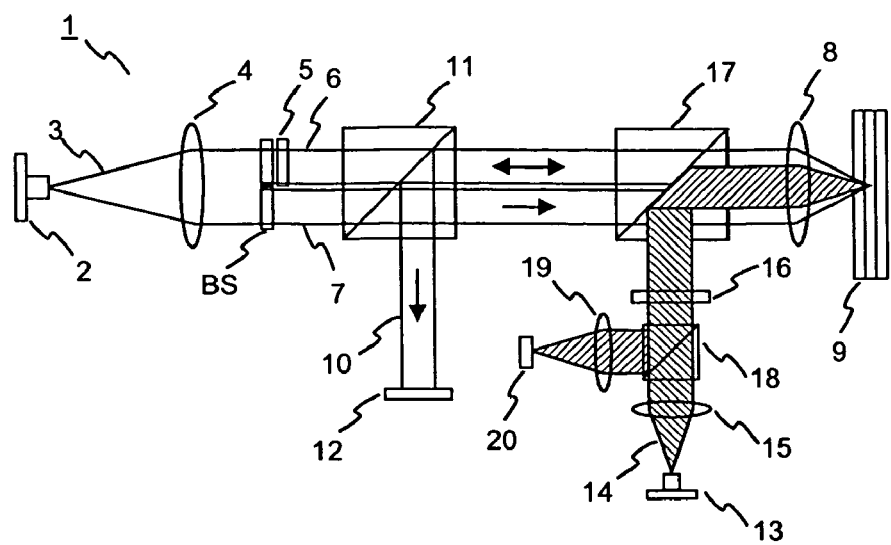
Fig. 1
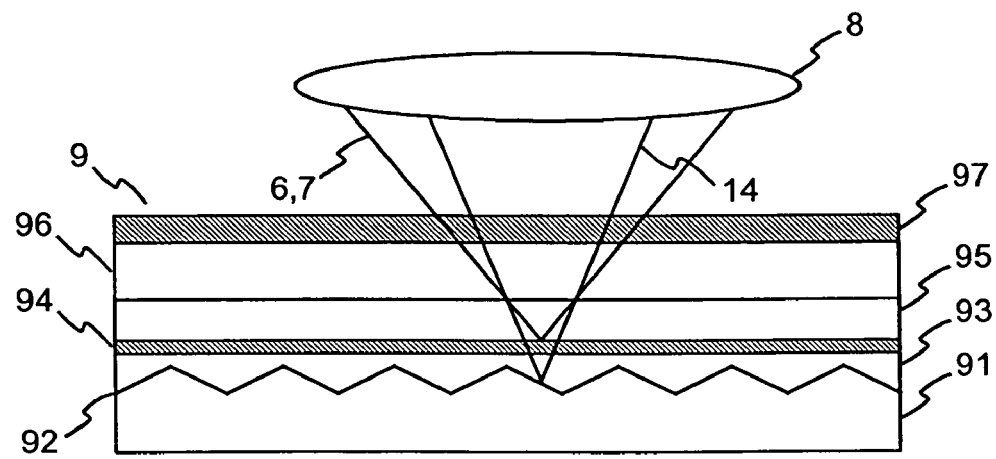
Fig. 2 - Prior Art

HOLOGRAPHIC RECORDING MEDIUM AND PICKUP FOR THIS MEDIUM

This application claims the benefit, under 35 U.S.C. §119, of European Patent Application No. 07123971.9 of 21 Dec. 2007.

FIELD OF THE INVENTION

The present invention relates to a holographic recording medium, and more specifically to a holographic disk medium with an improved servo structure. The invention further relates to an optical pickup for this holographic recording medium.

BACKGROUND OF THE INVENTION

In holographic data storage digital data are stored by recording the interference pattern produced by the superposition of two coherent laser beams. One advantage of holographic data storage is the possibility to store multiple data in the same volume, e.g. by changing the angle between the two beams or the wavelength, by using phase-coded reference beams, etc. To reliably retrieve the information, the physical properties of the holographic storage system during readout have to be the same as during recording. This means that the reference beam needs to have the same wavelength, the same wavefront error, the same beam profile, the same phase code if phase coding multiplexing is used, etc. Furthermore, the hologram has to be illuminated under the same angle and at the same position. For a precise controlling of the necessary focusing and tracking servo it is advantageous to have a servo layer as an additional layer underneath the holographic material of a holographic recording medium.

In EP1310952 Horimai et al. disclose the concept of having a substrate similar to a DVD (Digital Versatile Disk) as a guiding structure underneath the holographic material of a holographic disk medium. In this case a servo light beam is focused onto the holographic disk medium with the same objective lens as the holographic beam, i.e. the light beam used for holographic recording or readout. When the holographic and the servo beams are fixed relatively to each other, the servo beam can act as a reference for the beam used for holographic recording. The servo beam is focused onto the guiding structure, whereas the holographic beam is focused as appropriate for the chosen holographic recording process. Though this approach facilitates the retrieval of recorded holograms, a disadvantage is that the guiding structure of the servo layer interferes with the light used for recording or reading the holograms. Therefore, this layer has to be separated from the hologram layer with a dichroic mirror and a so-called flattening layer. This makes manufacturing of the holographic disk medium complicated and, therefore, expensive.

SUMMARY OF THE INVENTION

It is an object of the invention to propose a holographic recording medium with an improved servo structure.

According to the invention, this object is achieved by a holographic recording medium with a hologram layer for storing holograms and a servo layer for positioning a light beam for reading and/or recording of a hologram relative to the holographic recording medium, wherein the servo layer is an essentially flat dye recording layer.

The invention eliminates the need to produce the above mentioned flattening layer by using a blank disk substrate in combination with a dedicated dye recording layer. This greatly simplifies manufacturing of the holographic recording medium. By applying the dye recording layer onto a mirror-like, unformatted surface, wavefront distortions caused by a preformatted substrate do not occur. At the same time any servo structure can be recorded into the recording layer, for example a DVD-like servo layer. An alternative to the dye recording layer is a recording layer using a phase change material. For maintaining the recording layer flat even after recording of the servo structure, it is advantageous if the material of the recording layer undergoes no or only a small extension upon recording.

The servo information is favorably provided after the media fabrication. In case of holographic disks the servo information advantageously includes one of a spiral track or concentric tracks. These are recorded with a high-precise recorder system, e.g. a spin-stand, as it is similarly used for disk mastering. With multi-beam technology this kind of medium initialization is performed sufficiently fast and does not hamper manufacturing of the recording medium with sufficient low cycle times, especially if a simple track structure is applied.

In order to prepare the holographic recording medium for recording, servo information is recorded in the recording layer. In case this is not done directly after manufacturing of the recording medium, advantageously a holographic pickup is provided for this purpose in a holographic storage system. Besides a light source for generating holographic light beams for reading a hologram from and/or recording a hologram in the holographic recording medium, the pickup further includes a light source for generating a light beam, which interacts with the recording layer for recording servo information.

Preferably, the material of the recording layer is sensitive to a first wavelength but insensitive to a second wavelength. In this way the servo information can be recorded with the servo light beam, e.g. by increasing the power of the servo light beam, but remains uninfluenced by the holographic light beams. Alternatively, the recording layer is deposited in such a way that a focused light beam is able to record servo information, whereas a non-focused or less well focused light beam is not. As a further alternative, the material of the recording layer is neither sensitive to the wavelength of the servo light beam nor sensitive to the wavelength of the holographic light beams, but sensitive to a third wavelength. In this case the servo information is recorded with a dedicated light source emitting a light beam at the third wavelength. Of course, instead of recording the servo information with a focused light beam it is also possible to record the servo information in a single step using a mask for illuminating the complete recording layer. Alternatively, part of the servo information is recorded in a single illuminating step, whereas another part is recorded using a focused light beam. This allows, inter alia, to record certain general servo information as part of the media fabrication, whereas more specific or user generated servo information is recorded during use of the holographic recording medium.

Advantageously, the recording layer has dichroic properties with regard to a wavelength used for a servo light beam and a wavelength used for holographic light beams. This means that the information recorded in the recording layer does not cause a reflectivity or phase modulation of the holographic light beams. In this way the dichroic layer is no longer necessary and can be omitted, which further simplifies manufacturing of the holographic recording medium.

Advantageously, the holographic recording medium is a holographic disk. However, the invention is likewise applicable to other types of holographic recording media, such as a holographic storage card etc.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 schematically depicts a holographic pickup used in a holographic storage system, FIG. 2 shows a cross sectional view of a known holographic recording medium.

DETAILED DESCRIPTION OF PREFERRED EMBODIMENTS

Figure 3:
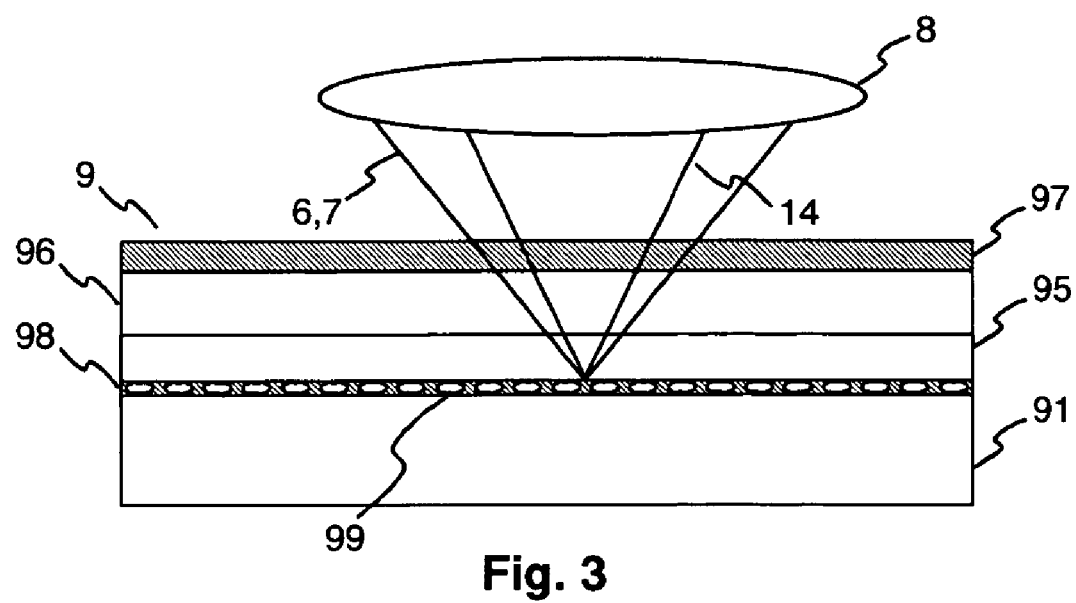
FIG. 3 depicts a cross sectional view of a holographic recording medium according to the invention.

In holographic data storage digital data are stored by recording the interference pattern produced by the superposition of two coherent laser beams. An exemplary setup of a holographic pickup 1 for use in a holographic storage system is shown in FIG. 1. A source of coherent light, e.g. a laser diode 2, emits a light beam 3, which is collimated by a collimating lens 4. Typically, the light beam 3 is in a blue or green wavelength range. The light beam 3 is then divided into two separate light beams 6, 7. In the example the division of the light beam 3 is achieved using a beam splitter BS. However, it is likewise possible to use other optical components for this purpose. A spatial light modulator (SLM) 5 modulates one of the two beams, the so called "object beam" 6, to imprint a 2-dimensional data pattern. Both the object beam 6 and the further beam, the so called "reference beam" 7, are focused into a holographic recording medium 9, e.g. a holographic disk, by an objective lens 8. At the intersection of the object beam 6 and the reference beam 7 an interference pattern appears, which is recorded in a photo-sensitive layer of the holographic recording medium 9.

The stored data are retrieved from the holographic recording medium 9 by illuminating a recorded hologram with the reference beam 7 only. The reference beam 7 is diffracted by the hologram structure and produces a copy of the original object beam 6, the reconstructed object beam 10. This reconstructed object beam 10 is collimated by the objective lens 8 and directed onto a 2-dimensional array detector 12, e.g. a CCD-array, by a first beam splitter 11. The array detector 12 allows to reconstruct the recorded data.

In order to simplify positioning of the object and reference beams 6, 7 relative to the holographic recording medium 9, the holographic recording medium 9 is provided with a servo layer. The holographic pickup 1 includes a further light source 13 for generating a servo light beam 14. The servo light beam 14 usually is in a red wavelength range. The servo light beam 14 is collimated by a further collimating lens 15 and coupled into the beam path of the object and reference beams 6, 7 by a second beam splitter 17. The servo light beam 14 is then focused onto the servo layer by the objective lens 8. The light beam reflected by the servo layer is again collimated by the objective lens 8 and directed towards a detector 20 by the second beam splitter 17 and a third beam splitter 18. A lens 19 focuses the reflected light beam onto the detector 20. The servo light beam 14 advantageously has a different wavelength than the object and the reference beams 6, 7. In this case a wavelength selective beam splitter can be used as the second beam splitter 17. Preferably, the servo light beam 14 in addition is a linearly polarized light beam, which allows to implement the third beam splitter 18 as a polarization selective beam splitter. The path of the servo light beam 14 then includes a quarter wave plate 16 for rotating the direction of polarization of the reflected servo light beam 14 by 90 degrees relative to the direction of polarization of the servo light beam 14 emitted by the light source 13.

As described above, the servo light beam 14 is focused onto the holographic recording medium 9 with the same objective lens 8 as the light beams 6, 7 used for holographic recording. As the holographic light beams 6, 7 and the servo light beam 14 are fixed relatively to each other, the servo light beam 14 acts as a reference for the light beam 6, 7 used for holographic recording. Due to their different wavelengths and their different collimation the holographic light beams 6, 7 and the servo light beam 14 have different foci.

A cross sectional view of a known holographic recording medium 9 is shown in FIG. 2. The holographic recording medium 9 has a hologram layer 96 and a servo layer 92. The servo light beam 14 is focused onto a guiding structure of the servo layer 92, which is illustrated by the sawtooth-like boundary between the servo layer 92 and a flattening layer 93. In the figure the size of the guiding structure is exaggerated for illustration purposes. In contrast, the holographic light beams 6, 7 are focused as appropriate for the chosen holographic recording process through the hologram layer 96 and a spacer layer 95 onto a dichroic mirror layer 94, which is transparent for the wavelength of the servo light beam 14, but reflective for the wavelength of the holographic light beams 6, 7. The servo layer 92 is arranged above a substrate 91 and separated from the mirror layer 94 by the flattening layer 93. Located above the hologram layer 96 is a cover layer 97. It is likewise possible to place the servo layer 92 above the hologram layer 96, separated by an adapted flattening layer 93. In this case, however, the distortions of the holographic light beams 6, 7 caused by the servo layer 92 have to be compensated, e.g. by increasing the distance between the hologram layer 96 and the servo layer 92 such that the holographic beams 6, 7 have a comparatively large diameter when passing the servo layer 92.

FIG. 3 depicts a cross sectional view of a holographic recording medium 9 according to the invention. The servo layer 92 and the flattening layer 93 are replaced by a dedicated dye recording layer 98. Alternatively, the recording layer 98 is made of a phase change material. The recording layer 98 is arranged on an essentially flat (unformatted) substrate 91 and is thus also essentially flat. The recording layer 98 thus has no pits or depressions. The recording layer 98 is realized, for example, with a phase change or dye material. Recorded into the recording layer 98 is servo information 99. The recording layer 98 is advantageously designed in such a way, that in particular no reflectivity or phase modulation of the holographic light beams 6, 7 is caused by the servo information 99. This is achieved, for example, by using a material that changes its reflectivity for the wavelength of the servo light beam upon a phase change, whereas the reflectivity is not changed for the wavelength of the holographic light beams. In this case also the dichroic mirror layer 94 can be omitted, as depicted in FIG. 3.

Since the dedicated recording layer 98 is applied onto a mirror-like surface, wavefront distortions from a preformatted substrate do not occur. The recording layer 98 thus eliminates the need for the flattening layer 93. Consequently, any track or servo structure can be recorded into the recording layer 98, e.g. a DVD-like servo structure having tracks.

Advantageously, the servo information 99 is applied after the media fabrication. In case of optical disks, the servo information 99 includes a spiral data track or concentric data tracks. These tracks are preferably recorded with a high-precise recorder system, as it is similarly used for disk mastering.

What is claimed is:

1. A holographic recording medium with a hologram layer for storing holograms and a servo layer for positioning a light beam for reading or recording of a hologram relative to the holographic recording medium, wherein the servo layer is a flat dye recording layer located on a side of the hologram layer opposite an illuminated side and wherein an embossed guide structure is absent in the flat dye recording layer.

2. The holographic recording medium according to claim 1, wherein the material of the dye recording layer is sensitive to a first wavelength but insensitive to a second wavelength.

3. The holographic recording medium according to claim 1, wherein the dye recording layer has dichroic properties with regard to a wavelength used for a servo light beam and a wavelength used for holographic light beams.

4. The holographic recording medium according to claim 3, wherein information recorded in the dye recording layer does not cause a reflectivity or phase modulation of the holographic light beams.

5. A method for preparing a holographic recording medium, having the steps of:
generating a light beam with a light source;
illuminating a flat dye recording layer of the holographic recording medium with the light beam, the flat dye recording layer located on a side of a hologram layer opposite the light source, wherein an embossed guide structure is absent in the flat dye recording layer; and
recording servo information in the flat dye recording layer with the light beam.

6. The method according to claim 5, wherein the servo information recorded in the dye recording layer includes one of a spiral track or concentric tracks.

\* \* \* \* \*